Jan. 25, 1966  J. K. BRUCE  3,231,131
DISPENSING APPARATUS

Filed July 12, 1963  5 Sheets-Sheet 1

INVENTOR.
JOHN K. BRUCE
BY
Christie, Parker & Hale
ATTORNEYS.

Jan. 25, 1966 J. K. BRUCE 3,231,131
DISPENSING APPARATUS

Filed July 12, 1963 5 Sheets-Sheet 2

INVENTOR.
JOHN K. BRUCE
BY
Christie, Parker & Hale
ATTORNEYS

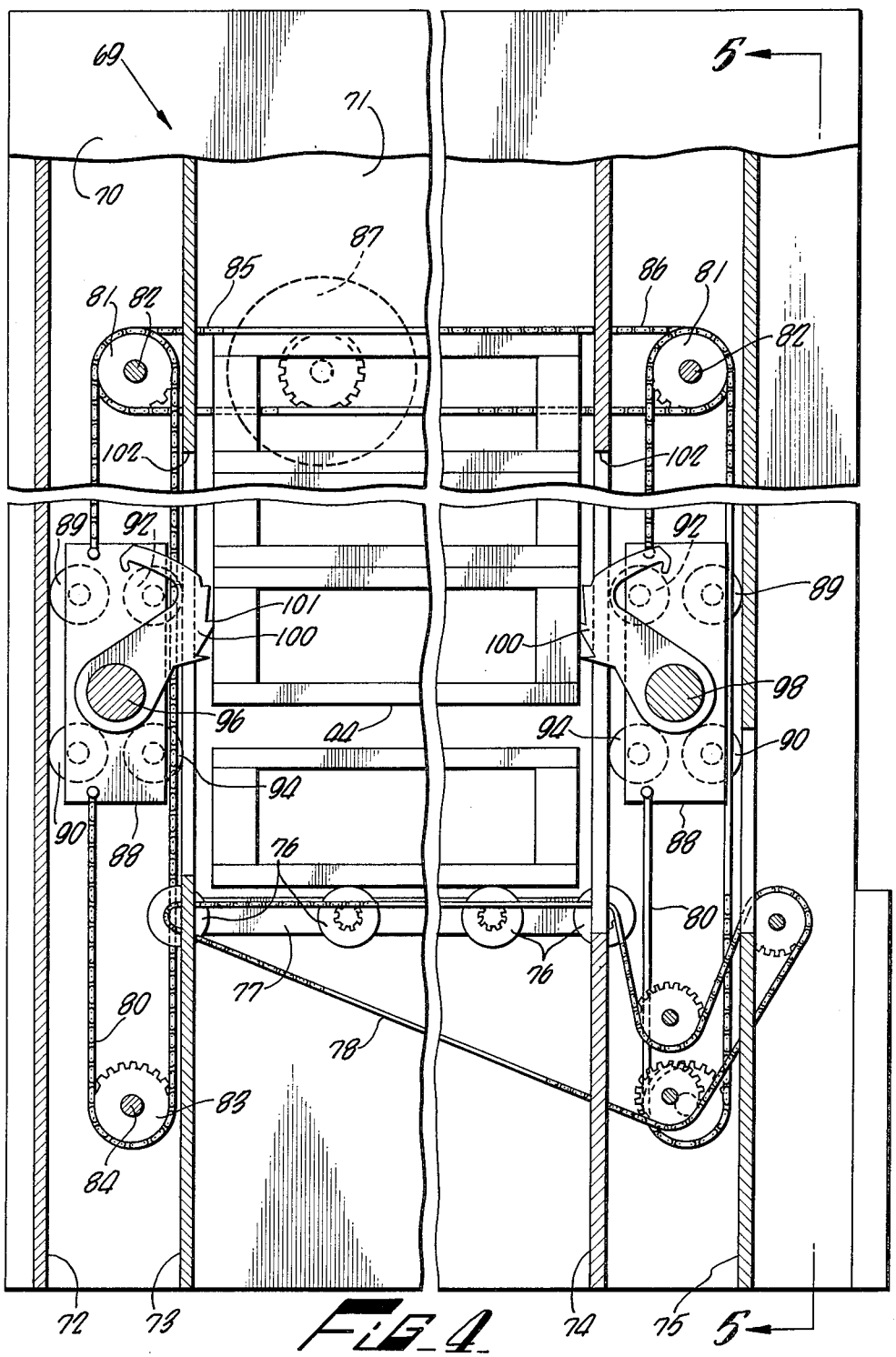

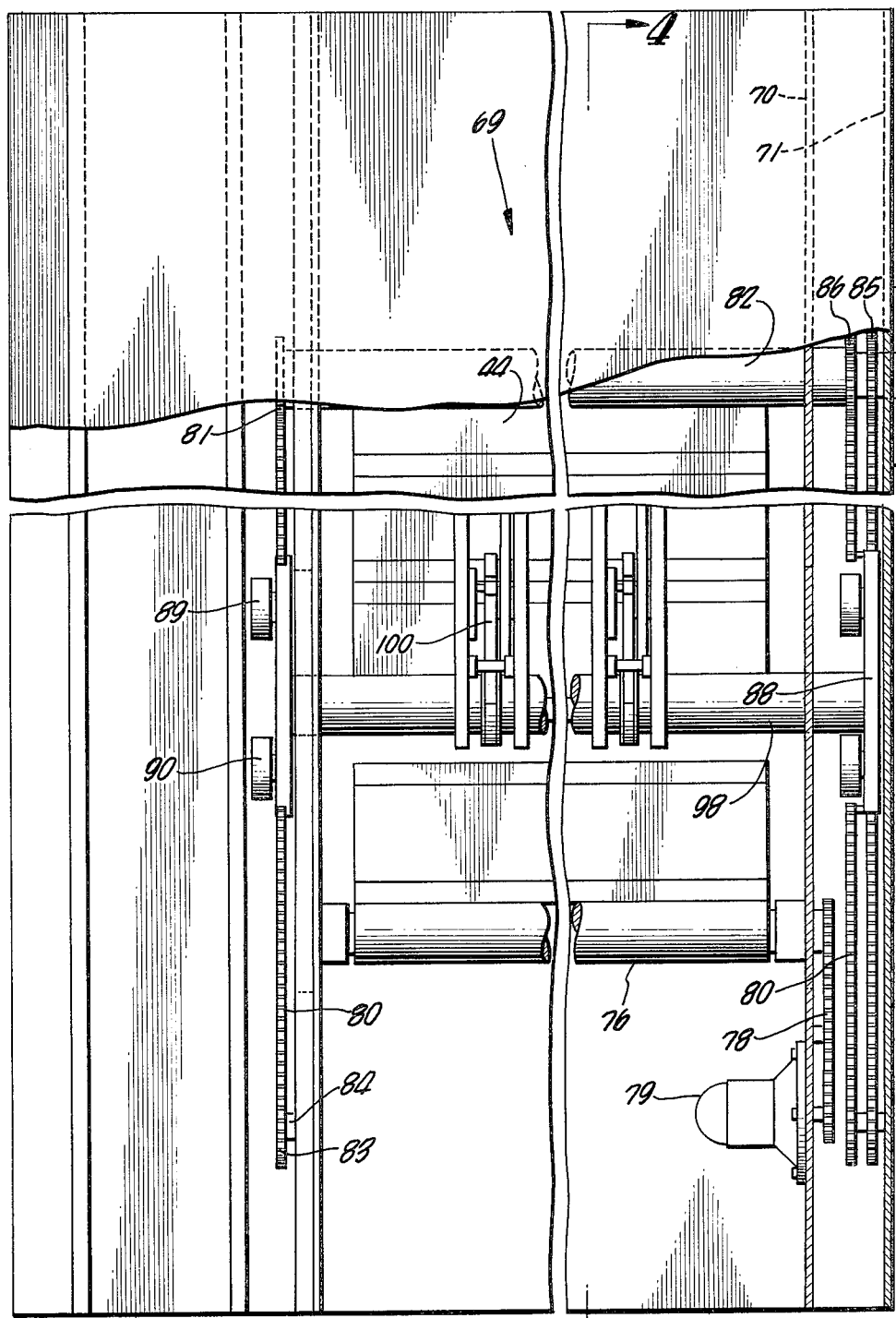

Jan. 25, 1966  J. K. BRUCE  3,231,131
DISPENSING APPARATUS
Filed July 12, 1963  5 Sheets-Sheet 5

INVENTOR.
JOHN K. BRUCE
BY
Christie, Parker & Hale
ATTORNEYS.

United States Patent Office 3,231,131
Patented Jan. 25, 1966

3,231,131
DISPENSING APPARATUS
John K. Bruce, La Verne, Calif., assignor of one-half to United California Bank, a corporation of California
Filed July 12, 1963, Ser. No. 294,502
4 Claims. (Cl. 221—290)

This invention relates to apparatus for dispensing articles from the bottom of a stack of the articles.

Although the apparatus is useful for dispensing articles of many different types, it is particularly well adapted for handling wooden pallets on which material is stacked or stored, and it is described with reference to that use. Such pallets are often used with automatic stacking machines which form stacks of material on the pallets that are fed automatically, and usually singly, to the stacking machine.

This invention provides simple and reliable apparatus for discharging pallets and like articles from the bottom of a stack, regardless of nominal variations in sizes and alignment of the stacked articles. Preferably, the articles are discharged one at a time, but the invention can be modified to discharge any desired number.

Briefly, the apparatus includes a platform disposed under a stack of articles, such as pallets, from which the articles are to be discharged. At least one pair of dogs is disposed above the platform, with the dogs located on opposite sides of the bottom pallet of the stack. Means urge each dog toward the bottom article of the stack to engage it and support the stack above the platform. Means are provided for moving the dogs and platform relatively toward each other so the platform can engage and support the bottom article in the stack. Means responsive to the movement of the dogs and platform closer together force the dogs away from the bottom article as it is engaged by the platform. Holding means keep the dogs away from the bottom article in the stack, and means are provided for moving the dogs and platform relatively away from each other. Means responsive to the movement of the dogs and platform away from each other release the holding means so the dogs are urged to engage the nearest article in the stack nearest the bottom. Thus, as the platform and dogs continue to move relatively away from each other, the pallet which had been on the bottom of the stack is supported on the platform free of the stack, and the pallet which had been resting on the pallet now on the platform becomes the bottom pallet in the stack and is held by the dogs.

Preferably, a conveyor is provided on the pallet to move the pallet resting on it to a loading or stacking station. In one form, the platform is moved up and down relative to the dogs in the stack, and in another, the dogs and stack of pallets are moved up and down relative to the platform.

In the presently preferred embodiment of the invention, an over-center spring is attached to the dogs to urge them inwardly, i.e., toward each other and the pallet between them, when the platform and dogs are relatively far apart. When the platform and dogs are moved together so that a pallet rests on the platform and the dogs are moved outwardly from engagement with the pallet, the over-center spring is shifted to urge the dogs outwardly to permit the bottom pallet to be separated from the stack. After sufficient movement has taken place to clear the bottom pallet from the dogs, they are driven inwardly and the over-center spring then urges the dogs toward each other and into engagement with the succeeding pallet.

In another form of the invention, a weight is secured to the dogs to urge them inwardly, and a pawl-latch arrangement engages the dogs to hold them in an outer position as the bottom pallet is supported on the latform. Means are provided for releasing the pawl-latch arrangement as the dogs and platform are moved apart so the weight can urge the dogs into contact with the succeeding pallet and permit the bottom pallet to rest on the platform free of the stack.

Preferably, suitable stop means are provided to prevent over travel of the dogs inwardly when no pallets are between them.

Preferably, the dogs operate independently of each other and can move inwardly and outwardly to accommodate pallets or other articles of various sizes without damaging the apparatus.

These and other aspects of the invention will be more fully understood from the following detailed description and the accompanying drawings, in which:

FIG. 4 is a fragmentary sectional elevation taken on line 4—4 of FIG. 5 of an alternate embodiment of the apparatus which uses a weight for urging the dogs inwardly;

FIG. 5 is a view taken on line 5—5 of FIG. 4;

FIG. 7 is a view taken on line 7—7 of FIG. 6.

Figure 1:
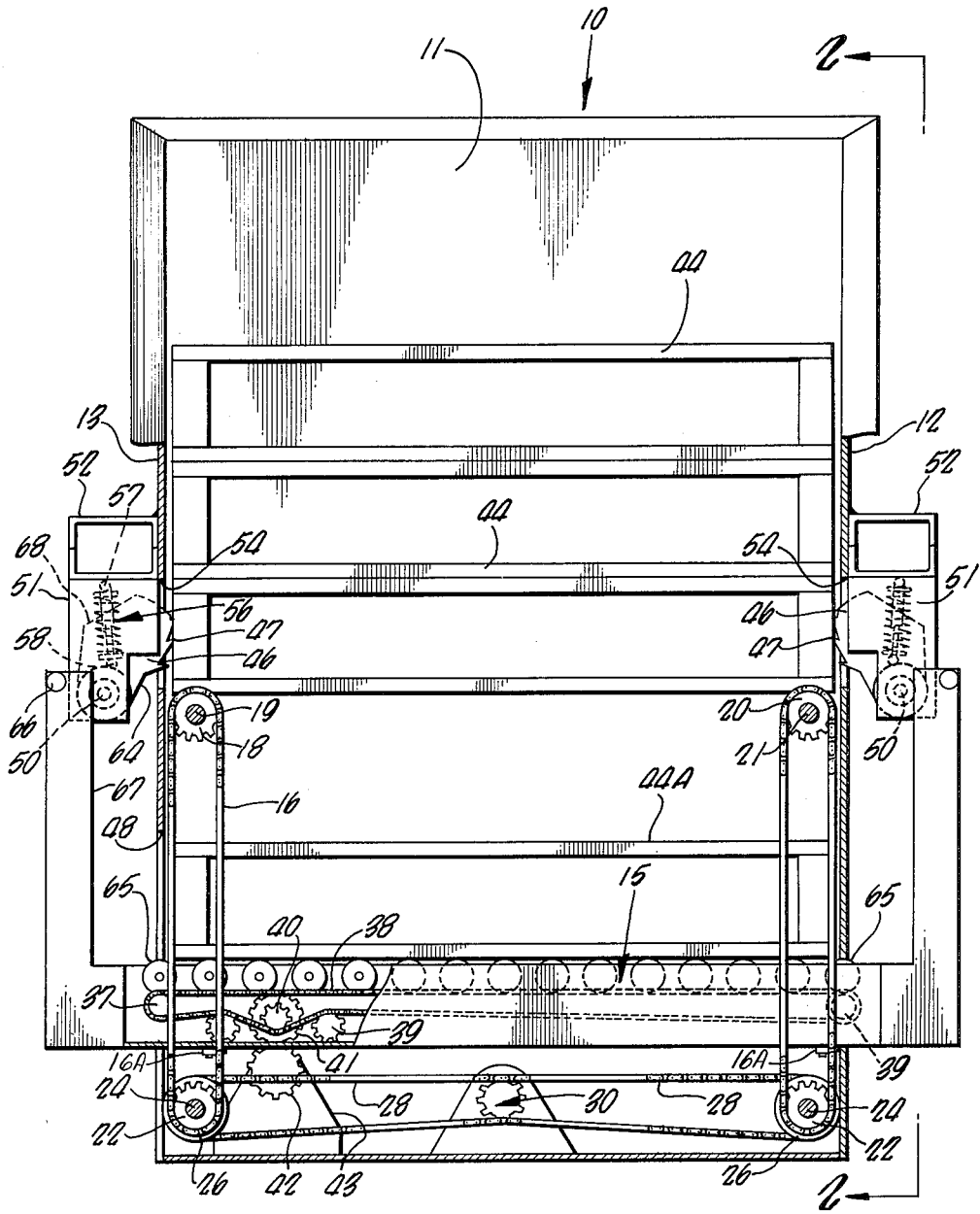
FIG. 1 is an elevation, partly in section, taken on line 1—1 of FIG. 2, of the presently preferred embodiment of the apparatus.
Figure 2:
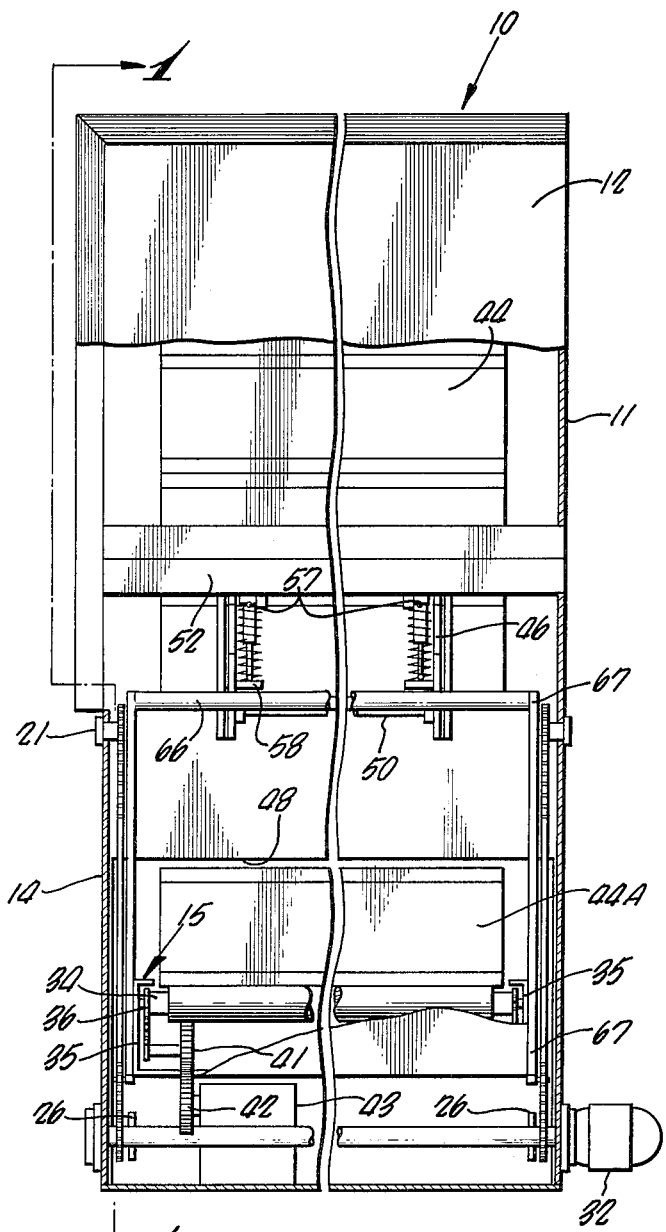
FIG. 2 is a fragmentary side elevation, partly broken away, taken on line 2—2 of FIG. 1.

Referring to FIGS. 1 and 2, a dispenser or hopper 10 includes a vertical forward wall 11 and right and left side walls 12 and 13, respectively, secured to the sides of the forward wall. A rear cover wall 14 is secured across the lower half of the left and right side walls opposite the forward wall. A platform 15, which is of rectangular shape in plan view, is disposed in the lower portion of the dispenser, and is supported at each of its four corners by a cleat 16A which engages respective hoisting chain 16. Each hoisting chain adjacent the left wall is disposed around a respective upper sprocket 18 on a rotatable transverse horizontal left upper shaft 19 journaled in the forward wall and the upper portion of the rear cover plate. Each hoisting chain adjacent the right wall is disposed around a respective upper sprocket 20 journaled on a rotatable transverse horizontal right upper shaft 21 journaled in the forward wall and the upper portion of the rear cover plate. Each hoisting chain also extends around a respective lower sprocket 22 mounted on two transverse horizontal lower shafts 24 journaled in the lower edges of the forward wall and the rear cover plate. Each lower shaft carries a driven sprocket 26, which is engaged by a separate respective drive chain 28 disposed around a separate respective driving sprocket 30 connected to a reversible hoisting motor 32 mounted on the outside of the forward wall. Thus, as the hoisting motor is turned in one direction, the platform is raised, and as it is turned in the other direction, the platform is lowered.

A plurality of rollers 34 are journaled at their ends in respective side rails 35 of the platform. The ends of the rollers near the cover plate each carry a respective roller sprocket 36 driven by a conveyor chain 38 disposed around idler sprockets 39 and a conveyor drive sprocket 40 connected to a driven spur gear 41 which meshes with a driving spur gear 42 on a conveyor motor 43. When the conveyor motor is rotated, say, in a clockwise direction (as viewed in FIG. 1), the rollers on the platform are driven in a counterclockwise direction. The circuits for automatically controlling the motors may be of conventional design, and are not shown because they form no part of the invention.

Figure 3:
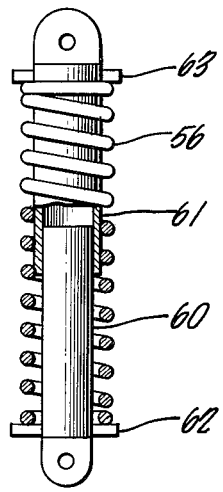
FIG. 3 is an enlarged elevation of one of the springs used to control the dogs in the apparatus shown in FIGS. 1 and 2.
Figure 1:
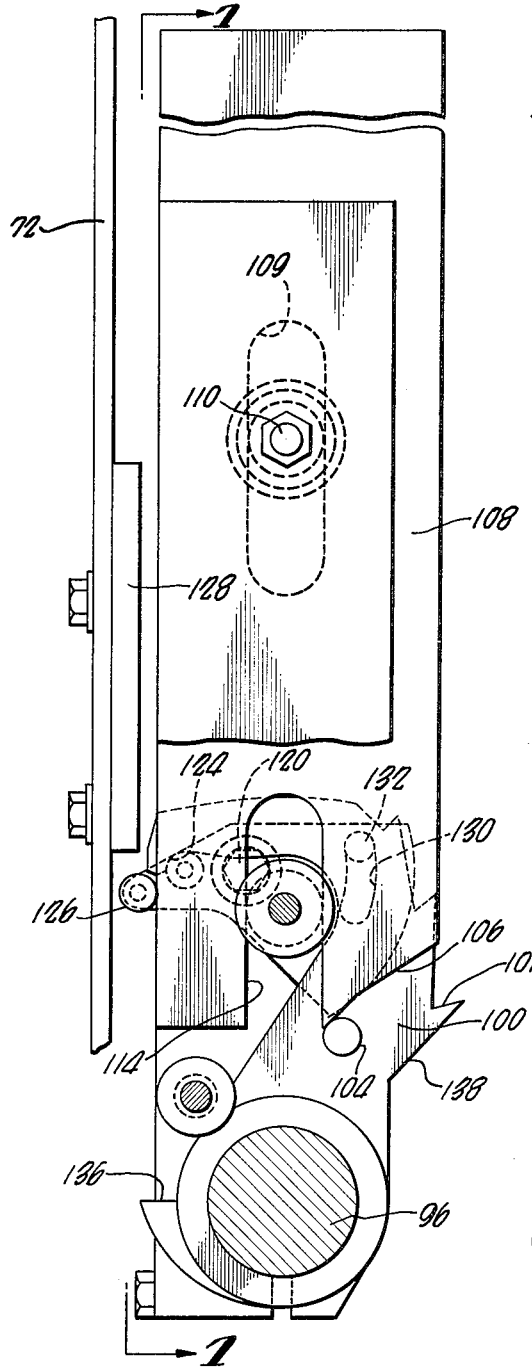

A stack of pallets 44 rests on a bottom pallet which is held above the platform by two pairs of dogs 46 with teeth 47 that dig into opposite sides of the wooden pallets. A dispensed pallet 44A rests on the rollers on the platform, and is ready to be discharged through a discharge opening 48 in the lower portion of the left side wall. The dogs are mounted in pairs to pivot on respective transverse horizontal rods 50 supported at their ends in the lower portions of brackets depending from box girders 52 mounted on the outside of the right and left rear walls. Each dog extends through a respective vertical slot 54 in the adjacent side walls. A separate tube and sleeve assembly is mounted adjacent each dog. In each assembly the upper end of an upright tube 60 telescopes into the lower end of a sleeve 61. A pivot pin 57 connects the upper end of each sleeve to an under portion of each box girder adjacent a respective dog. The lower end of each tube is connected by a pivot pin 58 to a respective dog near the pivot axis of the dog. As shown best in FIG. 3, a separate compression spring 56 is disposed around each tube and sleeve assembly. Opposite ends of each spring abut stops 62 and 63 attached to the tube and sleeve, respectively, to urge the tube and sleeve apart. Thus, with the dogs in the position shown in FIG. 1 to engage a pallet, each compression spring urges its dog inwardly against the bottom pallet in the stack.

The lower portion of each dog includes an upwardly and inwardly sloping cam surface 64 located inside the pivot axis of the dog. The cam surface 64 is engaged by a separate respective release roller 65 at opposite ends of the platform as the platform is raised to engage the bottom pallet in the stack. As the platform supports the bottom pallet, each release roller forces a respective pair of dogs outwardly until the lower end of each compression spring is outside of the rod 50 on which the dogs are pivotally mounted. Each spring then snaps its respective dog outwardly to hold it clear of the pallets in the stack.

As the platform is lowered with the dogs held outwardly by the springs, the stack lowers with it until a transverse horizontal setting bar 66 mounted at its ends to upright braces 67 secured to opposite sides of the platform strikes upwardly and inwardly inclined cam surface 68 on the upper and outside portion of the dogs, thereby driving the dogs inwardly to engage the pallet resting on the pallet which is on the platform. The stack is then prevented by the dogs from moving downwardly any farther, and the bottom pallet in the stack is carried down to the position shown by pallet 44A in FIG. 1. After the pallet on the platform is discharged by operation of the rollers, the foregoing process is repeated to release another pallet from the bottom of the stack.

Referring to FIGS. 4 and 5, a pallet hopper 69 includes vertical inner and outer forward walls 70, 71, respectively, inner and outer left walls 72, 73, and inner and outer right walls 74, 75, respectively. The side of the hopper opposite the forward wall is opened so that pallets can be loaded into it from a fork lift truck (not shown) onto transverse rollers 76 mounted on a platform 77 in the lower portion of the hopper and driven by a chain 78 from a conveyor motor 79 mounted on the face of the inside forward wall. A separate hoisting chain 80 is mounted at each corner of the hopper and is disposed around a respective upper sprocket 81 mounted on horizontal upper shafts 82 and around a lower sprocket 83 mounted on lower horizontal rotatable shafts 84. Each upper shaft is rotated by separate chain drives 85, 86 from a hoisting motor 87 mounted on the outside surface of the outside forward wall.

A separate carriage 88 is attached to each hoisting chain and includes upper and lower outer wheels 89, 90, respectively, which roll against the inside surface of the adjacent outer side wall. Upper and lower inner wheels 92, 94, respectively, on each carriage bear against the outside surface of the inner adjacent side wall. A left horizontal rod 96 is secured at each of its ends to the carriages mounted to move up and down between the left side walls, and a right rod 98 is similarly mounted on the carriages which move up and down between the right side walls. A pair of longitudinally spaced dogs 100 are mounted to pivot on each rod and carry teeth 101 on their inner portions to engage the sides of pallets 44 stacked within the hopper. Each dog extents through a respective elongated vertical slot 102 in each inner side wall.

Figure 6:
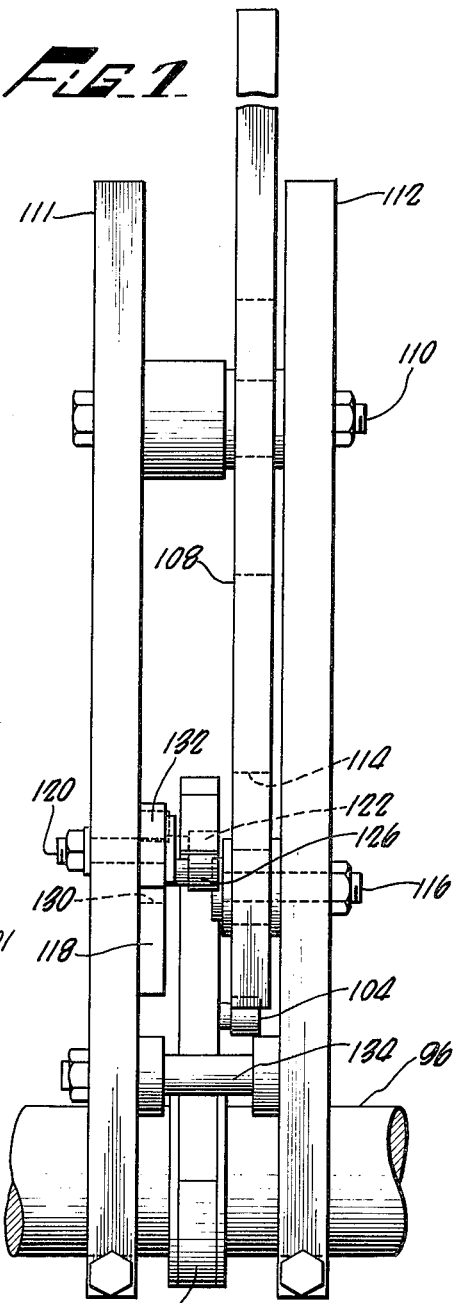
FIG. 6 is an enlarged view of a portion of the mechanism for actuating the dogs of the apparatus shown in FIGS. 4 and 5.

As shown best in FIGS. 6 and 7, a separate dog cam wheel 104 is mounted on each dog just above and slightly inside each rod on which the dog is pivoted. The dog cam wheel is engaged on its upper and outer portion by an upwardly and inwardly inclined cam surface 106 on the lower end of a counterweight 108 with urges its respective dog inwardly, i.e., toward the stack of pallets. The upper portion of the counterweight includes a vertical guide slot 109 through which is disposed a horizontal guide bolt 110 mounted through a pair of vertical and parallel forward and rear plates 111, 112, respectively, rigidly secured at their lower edges to the rod 96 on opposite sides of a respective dog. The lower portion of the counterweight includes a downwardly opening notch 114 which fits over a horizontal guide bolt 116 mounted in the rear plate. Thus, the counterweight is free to move up and down, but is prevented from pivoting.

A pawl 118 is mounted to pivot about a horizontal bolt 120 mounted in the forward plate. The center gravity of the pawl is inwardly of the bolt 120, so that the pawl tends to pivot in a clockwise direction, as viewed in FIG. 6. This causes a pawl latch wheel 122 on the pawl to be forced up into a downwardly opening retaining recess 124 in the lower left (as viewed in FIG. 6) portion of the dog when the dog is in the retracted position shown in FIGS. 6 and 7.

The pawl latch wheel 124 is released as the carriages and dogs are raised when a pawl cam wheel 126 on the outer end of the pawl strikes the lower edge of a trip plate 128 mounted on the inside face of the adjacent outer side wall. The pawl is forced to pivot in a counterclockwise direction (as viewed in FIG. 6), thus carrying the pawl latch wheel down from the recess in the dog, and permitting the counterweight to drive the dog inwardly to engage the side of a pallet. The pawl cam wheel is free to roll along the inner face of the trip plate. An arcuate pawl slot 130 receives a horizontal pawl stop pin 132 mounted in the forward plate to guide the pawl as it pivots about bolt 120. A horizontal dog stop pin 134 mounted between the lower portions of forward and rear plates is in the path of a step 136 on the dog to prevent the dog from pivoting too far inwardly when there are no pallets in the hopper.

With the hopper shown in FIGS. 4 through 7, a pallet is released from the bottom of the stack by lowering the carriages until the bottom pallet rests on the rollers on the conveyor. The end rollers on the conveyor each engage an upwardly and inwardly inclined cam surface 138 on each dog to drive each respective dog upwardly and outwardly to release the dog teeth from the sides of the bottom pallet. This movement is continued until the pawl and pawl latch wheel are forced to the position shown in FIG. 6 so that the dog is latched in the retracted position. The carriages are raised until the teeth on the dog clear the upper edge of the pallet resting on the rollers. At this point, each pawl cam wheel strikes the lower edge of a respective trip plate and each pawl latch wheel is driven down to unlatch each dog and permit the respective counterweights to drive the dogs outwardly so their teeth engage the pallet immediately above the one resting on the conveyor. The carriages are hoisted a slight distance farther until the pallet engaged by the dogs is lifted clear of the pallet resting on the rollers, which may then be turned to discharge the pallet from the hopper.

I claim:

1. Apparatus for discharging articles from the bottom of a stack of the articles, the apparatus comprising a platform disposed under the stack to receive articles released from the stack, at least one pair of dogs disposed above the platform and on opposite sides of the bottom article of the stack, spring means for each dog and movable between a first and second position, the spring means in the first position urging each dog toward the bottom article of the stack to engage it and support the stack above the platform, means for moving the dogs and platform relatively away from and toward each other so the platform can engage and support the bottom article in the stack, means responsive to the movement of the dogs and platform closer together to force the dogs away from the bottom article and move the spring means to the second position where they hold the dogs away from the bottom article in the stack, and means responsive to the movement of the dogs and platform away from each other to move the spring means to the first position so the dogs are urged to engage the next article in the stack nearest the bottom.

2. Apparatus for discharging articles from the bottom of a stack of the articles, the apparatus comprising a platform disposed under the stack to receive articles released from the stack, at least one pair of dogs disposed above the platform and on opposite sides of the bottom article of the stack to pivot toward and away from the stack, spring means for each dog and movable between a first and a second position, the spring means in the first position urging each dog toward the bottom article of the stack to engage it and support the stack above the platform, means for moving the dogs and platform relatively away from and toward each other so the platform can engage and support the bottom article in the stack, means responsive to the movement of the dogs and platform closer together to pivot the dogs away from the bottom article and move the spring means to the second position where they hold the dogs away from the bottom article in the stack, and means responsive to the movement of the dogs and platform away from each other to pivot the dogs toward the stack and move the spring means to the first position so the dogs are urged to engage the next article in the stack nearest the bottom.

3. Apparatus for discharging articles from the bottom of a stack of the articles, the apparatus comprising a plafform disposed under the stack to receive articles released from the stack, at least one pair of dogs disposed above the platform and on opposite sides of the bottom article of the stack to pivot toward and away from the stack, a separate spring means connected to each dog and movable with each dog between first and second positions, the springs in the first position urging each dog toward the bottom article of the stack to engage it and support the stack above the platform, means for moving the platform downwardly away from and upwardly toward the dogs so the platform can engage and support the bottom article in the stack, means on the platform for engaging each dog and pivoting them away from the stack as the platform moves upwardly so the springs are each moved to the second position where they urge the dogs away from the stack, and means on the platform for engaging the dogs and pivoting them toward the stack as the platform moves down to move each spring to the first position and so the dogs are urged to engage another article in the stack nearest the bottom.

4. Apparatus for discharging articles from the bottom of a stack of the article, the apparatus comprising:
a platform disposed under the stack to receive articles released from the stack,
at least one pair of dogs disposed above the platform and on opposite sides of the bottom article to pivot toward and away from the stack,
the dogs including a plurality of cam surfaces,
a telescoping link including a spring connected to each dog and movable with each dog between a first and second position,
the telescoping link spring urges each dog in the first position toward the bottom article of the stack to engage it and support the stack above the platform,
means for moving the platform upwardly toward the dogs so the platform can engage and support the bottom article of the stack,
a roller mounted on the platform for engaging each of the dog cam surfaces for pivoting the dog into its second position away from the stack as the platform moves upwardly,
means for moving the platform downwardly away from the dogs, and
a projection mounted on the platform engaging another of the dog cam surfaces and for pivoting the dogs into the first position toward the stack as the platform moves down to move each telescoping link spring to the first position and so the dogs are urged to engage another article nearest the bottom in the stack.

References Cited by the Examiner
UNITED STATES PATENTS

| | | | |
|---|---|---|---|
| 1,805,029 | 5/1931 | Baker | 221—251 |
| 2,089,385 | 8/1937 | Llewellyn et al. | 222—225 |
| 2,629,503 | 2/1954 | Neja | 221—236 |
| 2,702,132 | 2/1955 | Van Doren | 221—225 |
| 2,769,570 | 11/1956 | Adams | 221—221 |
| 2,885,111 | 5/1959 | Vann et al. | 221—224 |
| 2,974,828 | 3/1961 | Matteson | 221—251 |
| 3,034,684 | 5/1962 | Jackson | 221—251 |
| 3,074,595 | 1/1963 | Boller | 221—221 |

LOUIS J. DEMBO, *Primary Examiner.*

RAPHAEL M. LUPO, *Examiner.*